United States Patent Office 3,409,588
Patented Nov. 5, 1968

3,409,588
PREPARATION OF LINEAR ORGANO-POLYSILOXANES
Marcel Lefort, Caluire, and Parasko Nicou, Lyon, France, assignors to Rhone-Poulenc S.A., Paris, France, a French body corporate
No Drawing. Filed Mar. 8, 1966, Ser. No. 532,586
Claims priority, application France, Mar. 12, 1965, 9,017
10 Claims. (Cl. 260—46.5)

The present invention relates to the preparation of linear organopolysiloxane oils and gums, more especially those having a viscosity of more than 100 centistokes at 25° C.

It is known to polymerise diorganopolysiloxanes by heating them in the presence of alkaline catalysts such as potassium hydroxide in aqueous solution. Unfortunately, this process is not applicable when the starting siloxanes contain hydrogen atoms directly attached to silicon atoms, because the Si–H groupings react with the alkaline agents.

Because of this difficulty, it has been proposed to effect the polymerisation of organohydrogenopolysiloxanes in the presence of mineral acids such as sulphuric acid. By this process, it is possible to obtain linear polysiloxanes containing Si–H bonds, but, since the polymerisation takes place in a heterogeneous medium, this reaction is very slow and does not readily give siloxanes of high molecular weight. In order to accelerate this polymerisation in the presence of an acid catalyst, it has been proposed to subject the reaction mixture simultaneously to ultrasonic vibrations, but this process is difficult to perform on an industrial scale.

It has also been suggested to obviate the disadvantages arising out of the heterogeneity introduced by the sulphuric acid by using a catalyst which is soluble in the medium, such as trimethylsilyl sulphate. However, the quantity of catalyst necessary for performing the polymerisation liberates such a large proportion of chain-limiting groupings that only liquid polysiloxanes of low viscosity are obtained.

A new process has now been found for the preparation of linear organopolysiloxane oils and gums which is applicable to the preparation of organopolysiloxanes free from, or containing, silicon-hydrogen bonds. The organopolysiloxanes which can be produced by the new process may, in general, be represented by the formula:

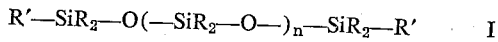
$$R'-SiR_2-O(-SiR_2-O-)_n-SiR_2-R' \quad \text{I}$$

in which the symbols R are identical or different and represent hydrogen atoms or substituted or unsubstituted monovalent hydrocarbon radicals which are saturated or ethylenically unsaturated, R' represents —OH or —HSO₄ or a radical R, and $n$ represents an integer from 100 to 8,500, with the provisos that not more than 2 hydrogens are attached to each terminal silicon atom, and that only a minor proportion, e.g. less than 10%, of the radicals R and R' are hydrogen or ethylenically unsaturated radicals, especially vinyl radicals, or both. It is to be understood that the average value of $n$ is not necessarily a whole number, and that the compounds may contain a proportion of molecules for which $n$ is outside the above-given limits.

The monovalent hydrocarbon radicals represented by R include especially lower alkyl radicals such as methyl and ethyl, alkenyl radicals such as vinyl or allyl, cycloalkyl radicals having from 3 to 6 carbon atoms such as cyclopropyl, cyclopentyl, cyclohexyl and methylcyclohexyl, aryl or alkylaryl radicals such as phenyl and methyl- and ethylphenyl and aralkyl radicals such as benzyl. R may in addition represent radicals derived from the aforesaid hydrocarbon radicals by replacement of one or more hydrogen atoms by atoms or radicals, more particularly chlorine atoms, which are not capable of interfering in the process of the invention or any subsequent vulcanising operation for which the gum is intended.

The process of the invention for the production of linear organopolysiloxanes, especially those of Formula I, comprises contacting a cyclic or oligomeric organosiloxane with a diorganosilyl sulphate, generally at a temperature between 20° and 150° C., preferably between 60° and 95° C., optionally in the presence of a chain limiter.

The organosiloxane starting materials may be cyclic or linear homopolymers or copolymers of fairly low molecular weight, especially those in which the organic groups are lower alkyl or phenyl, a minor proportion of the groups optionally being unsaturated, e.g. vinyl, or chlorine-containing. Depending upon the desired product, a single homopolymer or copolymer or a mixture of homopolymers or copolymers or both homo- and copolymers can be used.

The linear oligomeric organosiloxanes may be, for example, α,ω-dihydroxy-organopolysiloxanes.

Preferably, however, cyclic organosiloxanes are employed, because these are well-defined compounds which give readily reproducible results. Of these cyclic siloxanes, those containing from 3 to 8 ring silicon atoms are particularly advantageous, e.g. hexamethylcyclotrisiloxane, octamethylcyclotetrasiloxane, decamethylcyclopentasiloxane, dodecamethylcyclohexasiloxane, tetramethyltetra(chloromethyl)cyclotetrasiloxane, tetramethyltetravinylcyclotetrasiloxane, pentamethylpentavinylcyclopentasiloxane, hexamethylhexavinylcyclohexasiloxane, 1,3,5 - trimethyltrihydrogenocyclotrisiloxane, 1,3,5,7 - tetramethyltetrahydrogenocyclotetrasiloxane, and 1,3,5,7,9 - pentamethylpentahydrogenocyclopentasiloxane.

To obtain stable organopolysiloxanes, it is convenient to add, before the polymerisation is carried out, a chain limiter such as a linear diorganopolysiloxane of the formula:

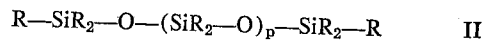
$$R-SiR_2-O-(SiR_2-O)_p-SiR_2-R \quad \text{II}$$

in which the symbols R, which are identical or different, represent hydrocarbon radicals such as those previously indicated, a proportion of the symbols R optionally representing hydrogen, and $p$ is 0 or an integer generally from 1 to 8. These siloxanes of Formula II, and their preparation, are described in the literature. For example, they may be prepared by cohydrolysis of a monofunctional silane of the formula (R)₃SiX and a bifunctional silane of the formula (R)₂SiX₂, in which the symbols R are as previously defined, and X represents a hydrolysable grouping, more specifically a chlorine atom. Also, they may be prepared by condensation of a chlorosilane (R)₃SiCl with a silane diol or a polysiloxane diol in the presence of a neutralisation agent for the hydrogen chloride formed.

In practice, the process of the invention can be operated as follows. The mixture of organopolysiloxanes to be copolymerised are first introduced into the reaction apparatus, and diorganosilyl sulphate is then added. The mixture is stirred to homogenise it, and then heated with stirring until its viscosity remains constant. The reaction lasts several hours, and on average about 7 hours in the case of operations carried out at about 80° C. A product containing SO₄⁻⁻ ions is obtained. It is neutralised by treating it in a mixing and kneading apparatus with a basic derivative, for example a metallic oxide, e.g. an oxide of aluminum, zinc or magnesium. Compounds such as ammonium carbonate may also be used.

Volatile materials may then be removed from the neutralised product by mixing and kneading it under a current of nitrogen for a number of hours at a temperature from 100° to 200° C. In this way, the siloxanes of low molecular weight are eliminated.

The diorganosilyl sulphate employed may be, for example, dimethylsilyl sulphate, which can readily be obtained from dimethyldichlorosilane and sulphuric acid. It may be prepared, for example, by the process described by Schmidt and Schmidbaur [Ber. 93 878 (1960)]. Other diorganosilyl sulphates may be employed, more particularly dialkylsilyl sulphates, including di(lower alkyl)-silyl sulphates such as diethylsilyl sulphate.

The proportion of diorganosilyl sulphate employed is not critical and may vary within fairly wide limits. For example, it may vary from 0.05% to 5% by weight expressed as $SO_4^{--}$ based on the total weight of organopolysiloxanes employed. Proportions between 0.1% and 1% are generally preferred.

Organopolysiloxane oils and gums with viscosities up to 20 million centipoises at 25° C., may be prepared by the new process. These oils and gums may be alkylpolysiloxanes, alkylphenylsiloxanes, alkylvinylpolysiloxanes, alkylhydrogenopolysiloxanes and alkylvinylhydrogenopolysiloxanes. Oils and gums containing a proportion of hydrogen atoms directly attached to silicon atoms may be very satisfactorily prepared by the new process.

The organopolysiloxanes so obtained have various uses. For example, the gums may be converted into elastomers by condensation with appropriate compounds: viz in the case of gums containing vinyl groups, organosilicon compounds containing Si–H bonds and in the case of gums having Si–H bonds, organosilicon compounds containing vinyl groups. Also, they may be used as components in compositions intended for various applications such as waterproofing and anti-adhesion treatment.

The following examples illustrate the invention.

Example 1

(a) Into a cylindrical borosilicate glass apparatus having a capacity of 1500 cc. (a diameter of 10.5 cm. and a height of 20 cm.), provided with a stirring system, a tube for the introduction of dry nitrogen and an ordinary condenser connected to a receiver cooled by a current of cold water, are introduced 1027 g. of octamethylcyclotetrasiloxane containing 0.45 g. of water, which is heated under a nitrogen atmosphere to a temperature of 80° C., 100 cc. of hot octamethylcyclotetrasiloxane are then withdrawn, and 4.83 g. of dimethylsilyl sulphate are added. 1.68 g. of 1,3,5,7-tetramethylcyclotetrasiloxane, 0.17 g. of tetradecamethylhexasiloxane, and the dimethylsilyl sulphate solution prepared as just described are then introduced into the apparatus. The mixture is stirred until it is homogeneous, and the contents of the apparatus are then heated for 7 hours at 78° C.

After cooling, 1000 g. of a firm, non-sticky gum are obtained. 378 g. of this gum are extracted and introduced into a mixing and kneading apparatus with 1.6 g. of anhydrous zinc oxide, and the whole is malaxated for two hours at ambient temperature and then for 7 hours at 200° C. under a current of nitrogen to eliminate the volatile products. 339 g. of a gum with a hydrogen content of $2.77.10^{-3}\%$ by weight and a viscosity of 2,750,000 centipoises at 25° C. are finally obtained.

The dimethylsilyl sulphate catalyst may be obtained as follows. Into a round-bottomed flask 387 g. (3 mol.) of dimethyldichlorosilane are introduced, and 196 g. of concentrated sulphuric acid ($d=1.83$) are added with stirring in one and a half hours. The reaction temperature gradually falls from 22° C. to −5° C., and a considerable evolution of hydrochloric acid is observed. The reaction temperature is then gradually raised to 85° C. at the end of one hour. The mixture is allowed to return to ambient temperature and is then distilled. The fraction boiling at 163–166° C. under 0.3 mm. Hg is dimethylsilyl sulphate (284 g.).

(b) By repeating this experiment, using as catalyst 1.36 cc. of sulphuric acid ($d=1.83$), which provides a quantity of $SO_4^{--}$ equal to that provided by 4.83 g. of dimethylsilyl sulphate, after heating an oil having a viscosity of only 11,000 centipoises at 25° C. is obtained.

Example 2

Into the same apparatus as that described in Example 1, a mixture of 1027 g. of octamethylcyclotetrasiloxane and 10 g. of α,ω-dihydroxy-dimethylpolysiloxane oil containing 8.5% by weight of hydroxyl groupings is introduced. 6.5 g. of 1,3,5,7-tetramethylcyclotetrasiloxane, 0.17 g. of tetradecamethylhexasiloxane, and 4.83 g. of dimethylsilyl sulphate in solution in 100 cc. of octamethylcyclotetrasiloxane are then added, and the polymerisation and the subsequent operations are carried out as described in Example 1. 993 g. of a gum having a hydrogen content of $11.1.10^{-3}\%$ and a viscosity of 3,400,000 centipoises at 25° C. are finally obtained.

Example 3

Into the same apparatus as in Example 1, 1027 g. of octamethylcyclotetrasiloxane are introduced and heated to 80° C. under a nitrogen atmosphere. 100 cc. of siloxane are withdrawn and mixed with 4.83 g. of dimethylsilyl sulphate. 2.31 g. of 1,3,5,7-tetramethyl-1,3,5,7-tetravinylcyclotetrasiloxane, 0.26 g. of tetradecamethylhexasiloxane, and the said dimethylsilyl sulphate solution are then introduced into the apparatus. The mixture is homogenised, and 10 g. of α,ω-dihydroxy-dimethylpolysiloxane oil containing 8.5% by weight of hydroxyl groupings are added. The contents of the apparatus are then heated for 7 hours at 95° C. After cooling, a gum is obtained of which 442 g. are withdrawn, and treated as in Example 1 with 1.86 g. of zinc oxide. After removal of volatile materials, 405 g. of a gum having a viscosity of 9 million centipoises at 25° C. are finally obtained.

Example 4

Into the same apparatus as that described in Example 1, 1027 g. of octamethylcyclotetrasiloxane are introduced and heated to 80° C. under a nitrogen atmosphere. 100 cc. of siloxane are withdrawn and mixed with 4.83 g. of dimethylsilyl sulphate. 6.4 g. of 1,3,5,7-tetramethyl-1,3,5,7-tetravinylcyclotetrasiloxane, 19 g. of 1,3,5,7-tetramethylcyclotetrasiloxane, 10.5 g. of tetrahydrogenodecamethylhexasiloxane of the formula:

$$CH_3-SiH_2-O[Si(CH_3)_2O]_4SiH_2-CH_3$$

obtained by cohydrolysis of methylchlorosilane and dimethyldichlorosilane, and then the dimethylsilyl sulphate solution prepared as stated above, are added to the apparatus. The mixture is homogenised and 11.5 g. of α,ω-dihydroxy-dimethylpolysiloxane oil containing 12% by weight of hydroxyl groupings are added. The contents of the apparatus are heated for 8 hours at 80° C. After cooling, an oil is obtained which is treated with 8 g. of ammonium carbonate with stirring at ambient temperature for 3 hours and then at 60° C. for 3 hours. The oil thus neutralised is then heated gradually to 130° C. under 1.5 mm. Hg to remove volatile materials. After filtration through silica, 625 g. of an oil having a hydrogen content of $50.10^{-3}\%$ by weight and a viscosity of 2650 centipoises at 20° C. are finally obtained.

Example 5

Exactly the same procedure is adopted as that described in Example 4, with the following reactants: 1027 g. of octamethylcyclotetrasiloxane; 4.83 g. of dimethylsilyl sulphate; 6.4 g. of 1,3,5,7-tetramethyltetravinylcyclotetrasiloxane; 22 g. of 1,3,5,7-tetramethylcyclotetrasiloxane; 9 g. of the tetrahydrogenodecamethylhexasiloxane described in Example 4; 11.5 g. of α,ω-dihydroxy-dimethylpolysiloxane oil containing 12% by weight of hydroxyl groupings; and 5 g. of ammonium carbonate. 740 g. of an oil having a hydrogen content of $54.10^{-3}\%$ by weight and a viscosity of 6500 centipoises at 20° C. are finally obtained.

Example 6

The procedure described in Example 4 is followed with the following reactants: 1027 g. of octamethylcyclotetrasiloxane; 4.83 g. of dimethylsilyl sulphate; 25.5 g. of 1,3,5,7-tetramethylcyclotetrasiloxane; 13 g. of the tetrahydrogenodecamethylhexasiloxane described in Example 4; 7.6 g. of α,ω-dihydroxyl-dimethylpolysiloxane oil containing 11.5% by weight of hydroxyl groupings; and 5 g. of ammonium carbonate.

600 g. of an oil possessing a hydrogen content of 77.10⁻³% by weight and a viscosity of 1040 centipoises at 20° C. are finally obtained.

Example 7

Into the same apparatus as that described in Example 1, 1027 g. of octamethylcyclotetrasiloxane, 2.96 g. of 1,3,5,7-tetramethyl-1,3,5,7-tetravinylcyclotetrasiloxane and 107 g. of a 4.5% dimethylsilyl sulphate solution in octamethylcyclotetrasiloxane are introduced. 7.3 g. of an α,ω-dihydroxy-dimethylpolysiloxane oil containing 11.6% by weight of hydroxyl groupings and 0.94 g. of tetrahydrogenohexamethyltetrasiloxane of the formula:

$$CH_3-SiH_2-O[Si(CH_3)_2-O]_2SiH_2-CH_3$$

are then added. The mixture is stirred and the contents of the apparatus are heated for 7 hours at 90° C., the subsequent operation being carried out as in Example 1. 1020 g. of a gum containing methyl and vinyl radicals and possessing two hydrogen atoms directly attached to each of the terminal silicon atoms are finally obtained. Its viscosity at 25° C. is 20 million centipoises.

Example 8

A diorganopolysiloxane gum having methyl, vinyl and dichlorocyclopropyl radicals

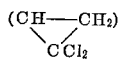

is prepared by the procedure of Example 1, using the following reactants: 448 g. of octamethylcyclotetrasiloxane; 1 g. of 1,3,5,7-tetramethyl-1,3,5,7 - tetravinylcyclotetrasiloxane; 1.5 g. of α,ω-dihydroxy-dimethylpolysiloxane oil containing 11.6% by weight of —OH groups; 21.6 g. of an diorganopolysiloxane containing α,ω-dihydroxycyclic and linear siloxanes, obtained by cohydrolysis of equimolar quantities of methyldichlorosilane and dichlorocyclopropylmethyldichlorosilane molecules of the formula:

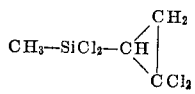

and containing 1.3% by weight of hydroxyl groupings and 42.6% by weight of dichlorocyclopropyl radicals; and 35 g. of a 4.5% dimethylsilyl sulphate solution in octamethylcyclotetrasiloxane. The polymerisation is effected by heating with stirring at 80–84° C. for 6 hours. The product is then treated as in Example 1 (using 1.8 g. of zinc oxide) and 470 g. of a gum having a viscosity of 20 million centipoises at 25° C. are finally obtained.

Example 9

Into a 1-litre cylindrical apparatus equipped as in Example 1 are introduced 300 g. of octamethylcyclotetrasiloxane containing 0.12 g. of water and 100 g. of 1,3,5,7-tetramethyl-1,3,5,7 - tetrachloromethylcyclotetrasiloxane. The mixture is heated to 95° C., 7.2 g. of a catalyst solution obtained by mixing 277 g. of dimethylsilyl sulphate with 750 g. of octamethylcyclotetrasiloxane are added. After heating for 5 hours at 95° C. with stirring, a very viscous oil is obtained, which is made fluid by addition of 2 g. of water. The reaction mixture is then maintained at 95° C. for 2 hours. After cooling, an oil is obtained which is neutralised with 2 g. of zinc oxide and from which the volatile constituents are eliminated by heating under reduced pressure (25 mm. Hg) to 200° C. 336 g. of linear organopolysiloxane oil containing methyl and chloromethyl groupings and 0.19% by weight of hydroxyl groupings are finally obtained. Its viscosity at 25° C. is 3250 centipoises.

We claim:
1. Process for the preparation of a linear organopolysiloxane oil or gum which comprises contacting (a) a cyclic organosiloxane or an α,ω-dihydroxy linear oligomeric organosiloxane, said cyclic or linear organopolysiloxane consisting of units of the formula:

wherein R is the same or different and is selected from the group consisting of lower alkyl, alkenyl, cycloalkyl, aryl, alkaryl, aralkyl, and the foregoing substituents substituted by at least one halogen atom hydrogen with (b) a dialkyl-silyl sulphate.

2. Process according to claim 1 in which R is lower alkyl, vinyl or phenyl.

3. Process according to claim 1 in which the reaction is carried out in the presence of a chain limiter of formula:

in which the symbols R, which are identical or different, represent hydrogen or inertly substituted or unsubstituted monovalent hydrocarbon radicals which are saturated or ethylenically unsautrated, and $p$ is an integer from 1 to 8.

4. Process according to claim 1, in which the cyclic organosiloxane contains 3 to 8 ring silicon atoms.

5. Process according to claim 4, in which the cyclic organosiloxane is octamethylcyclotetrasiloxane alone or in admixture with tetramethyltetravinylcyclotetrasiloxane or with 1,3,5,7-tetramethylcyclotetrasiloxane.

6. Process according to claim 1, in which the dialkylsilyl sulphate is a di(lower alkyl)silyl sulphate.

7. Process according to claim 6, in which the di(lower alkly)silyl sulphate is dimethylsilyl sulphate.

8. Process according to claim 1, in which the reaction is carried out at 60° to 95° C., in the presence of 0.1 to 1% by weight of the dialkylsilyl sulphate.

9. Process according to claim 1 in which R is selected from the group consisting of lower alkenyl, cycloalkyl of 3 to 6 carbon atoms, lower alkyl substituted with cycloalkyl of 3 to 6 carbon atoms in the ring, phenyl, lower alkyl substituted with phenyl, phenyl substituted with lower alkyl, and the foregoing radicals substituted by chlorine.

10. Process according to claim 1 in which R is selected from the group consisting of lower alkenyl, cycloalkyl of 3 to 6 carbon atoms, and such radicals substituted by one or two chlorine atoms.

References Cited

UNITED STATES PATENTS

| | | | |
|---|---|---|---|
| 2,759,008 | 8/1956 | Dunham et al. | 260—448.2 |
| 3,109,012 | 10/1963 | Rossmy et al. | |
| 3,148,201 | 9/1964 | Fassnacht | 260—448.2 |
| 3,183,254 | 5/1965 | Rossmy et al. | |
| 3,215,643 | 11/1965 | Pail. | |

FOREIGN PATENTS

| | | |
|---|---|---|
| 899,148 | 6/1962 | Great Britain. |
| 944,703 | 12/1963 | Great Britain. |
| 1,106,324 | 5/1961 | Germany. |

DONALD E. CZAJA, *Primary Examiner.*

M. I. MARQUIS, *Assistant Examiner.*